(12) United States Patent
Mikan et al.

(10) Patent No.: US 8,165,792 B2
(45) Date of Patent: Apr. 24, 2012

(54) METHODS AND SYSTEMS FOR BROADCASTING AN ESTIMATED TIME OF ARRIVAL

(75) Inventors: Jeffrey Clinton Mikan, Atlanta, GA (US); Justin McNamara, Atlanta, GA (US); John Ervin Lewis, Lawrenceville, GA (US); Fulvio Arturo Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 436 days.

(21) Appl. No.: 12/363,374

(22) Filed: Jan. 30, 2009

(65) Prior Publication Data

US 2010/0198646 A1 Aug. 5, 2010

(51) Int. Cl.
*G01C 21/00* (2006.01)
(52) U.S. Cl. .................. 701/204; 705/8; 705/9
(58) Field of Classification Search .......... 701/204, 701/207, 209; 705/8, 9
See application file for complete search history.

(56) References Cited

U.S. PATENT DOCUMENTS

| | | | |
|---|---|---|---|
| 2005/0227680 A1* | 10/2005 | Snowden | 455/416 |
| 2006/0218029 A1* | 9/2006 | Chin | 705/8 |
| 2007/0118415 A1* | 5/2007 | Chen et al. | 705/8 |
| 2008/0004002 A1* | 1/2008 | Chin et al. | 455/425 |
| 2008/0195312 A1* | 8/2008 | Aaron et al. | 701/209 |

OTHER PUBLICATIONS

"The Instinctive Interface coming to the Palm Pre", *Internet Article*, http://jkontherun.com/2009/01/21the-instinctive-interface-coming-to-the-palm-pre/, downloaded from the Internet on Jan. 29, 2009, (posted Jan. 21, 2009), 3 pages.

* cited by examiner

*Primary Examiner* — Helal A Algahaim
(74) *Attorney, Agent, or Firm* — Woodcock Washburn LLP

(57) ABSTRACT

A mobile device of a user may provide an Estimated Time of Arrival (ETA) of the user to other participants of a scheduled meeting. In providing the ETA, the mobile device may retrieve meeting information associated with the scheduled meeting, location information associated with the location of the user, and environmental condition information associated with an intended path of the user to the scheduled meeting. The mobile device may calculate the ETA to the scheduled meeting based on the meeting information, the location information, and the environmental condition information. The calculated ETA may then be transmitted to the other participants.

20 Claims, 10 Drawing Sheets

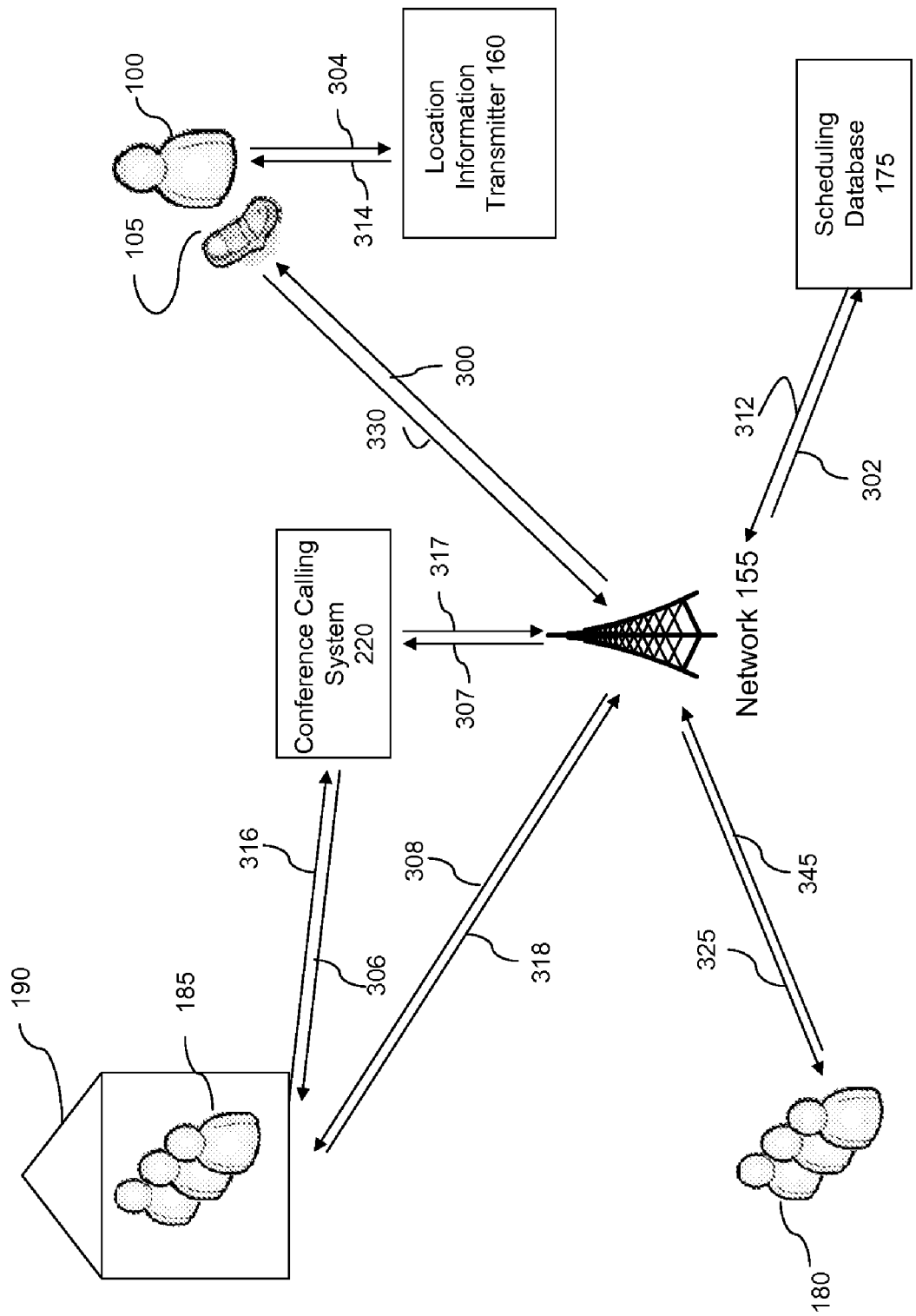

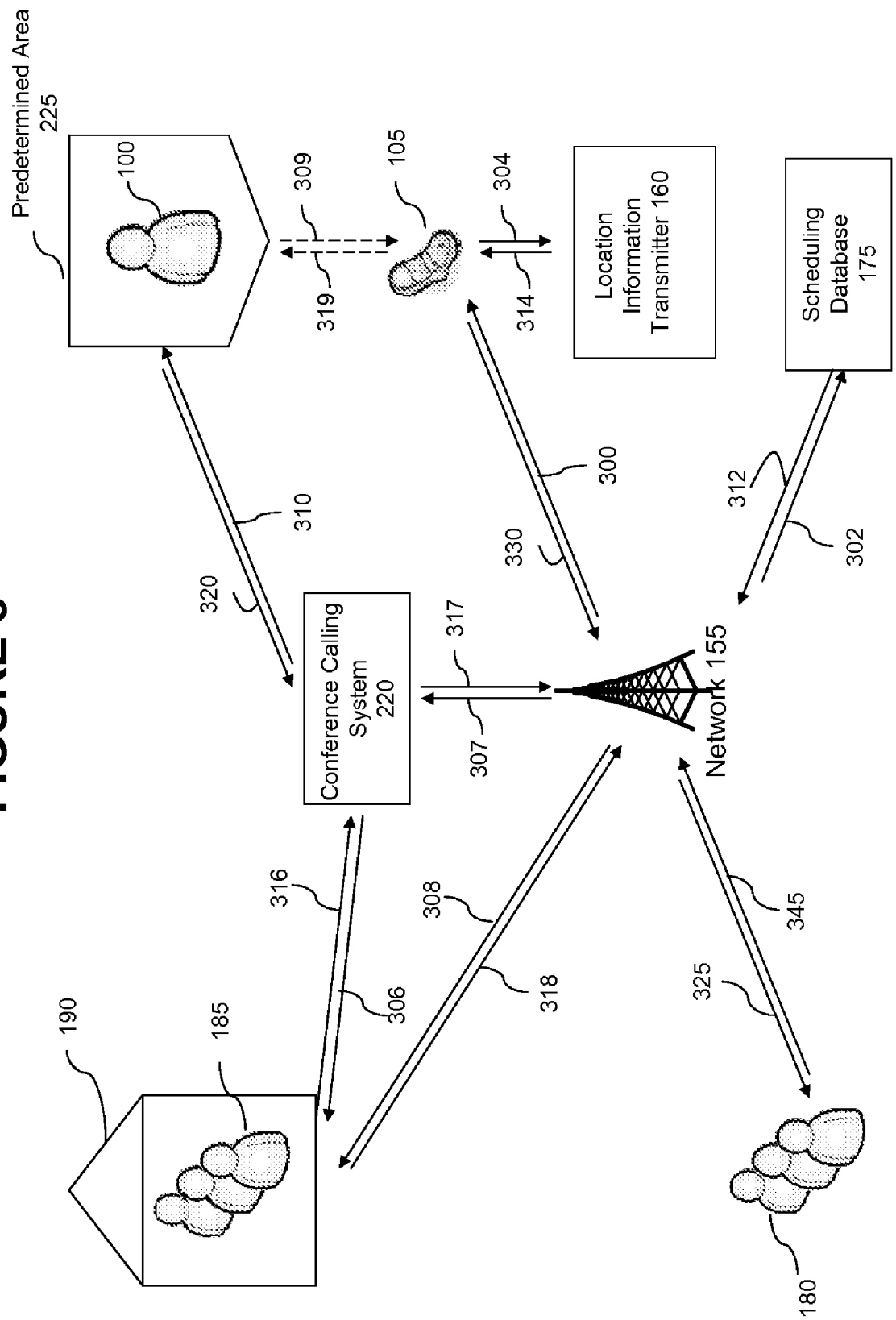

METHODS AND SYSTEMS FOR BROADCASTING AN ESTIMATED TIME OF ARRIVAL

BACKGROUND

Currently, an Estimated Time of Arrival (ETA) may be provided to a user of a mobile device such as Personal Data Assistant (PDA), cellular telephone, or the like after calculating the ETA. For example, a mobile device may calculate an ETA after determining the location and velocity of the mobile device. After calculating the ETA, the ETA may then be presented to the user via a display device associated with the mobile device. Upon viewing the ETA, the user may wish not only to notify other individuals of the ETA, but also to update the ETA as the user travels to the scheduled meeting location. Unfortunately, the user may not have the time or the proper information to contact each of the other users personally.

SUMMARY

Disclosed herein are methods and systems for broadcasting an ETA. In broadcasting an ETA, the mobile device may provide the user with an ETA to a schedule meeting location. To calculate the ETA, the mobile device may retrieve meeting information from a scheduling database, environmental conditions from an environmental conditions monitor, and location information from a location information transmitter. After retrieving the information, the mobile device may determine the current location of the user and a path of travel that the user may follow. The mobile device may then calculate the ETA in accordance with the meeting information, location information, and environmental conditions, and broadcast the ETA.

BRIEF DESCRIPTION OF THE DRAWINGS

The foregoing and other objects, aspects and advantages of providing and broadcasting an ETA may be better understood from the following detailed description with reference to the drawings.

FIG. 4 depicts an example embodiment of a system and process for initiating a conference call at the time of a scheduled meeting.

FIG. 5 depicts an example embodiment of a system and process for transferring a conference call to a landline when the location information indicates that the user may be within a predetermined area.

DETAILED DESCRIPTION OF ILLUSTRATIVE EMBODIMENTS

As may be described herein, a mobile device may be used by a user to provide an ETA to other scheduled meeting participants. In an example embodiment, the mobile device may receive information from numerous sources including a scheduling database, an environmental database, a location information transmitter, or the like. Upon receiving the information, the mobile device may analyze the information to discover scheduled meetings. Once a scheduled meeting has been discovered within the information, scheduled meeting participants and a scheduled meeting location may be determined. After determining the scheduled meeting location, the mobile device may determine a current location of the user in relation to the meeting location such that an ETA of the user may be calculated. The mobile device may then transmit the calculated ETA to the other scheduled meeting participants. The mobile device may also be used to reschedule a scheduled meeting, continue the scheduled meeting, and/or initiate a conference call at the time of the scheduled meeting. For example, the mobile device may have the ability to interact with the scheduling database and a conference calling system through a network. Additionally, the mobile device may be used to transfer the conference call to a landline when the location information indicates that the user may be within a predetermined area. The mobile device may also be used for terminating the conference call when the location information indicates that the user has arrived at the scheduled meeting location.

Figure 1:
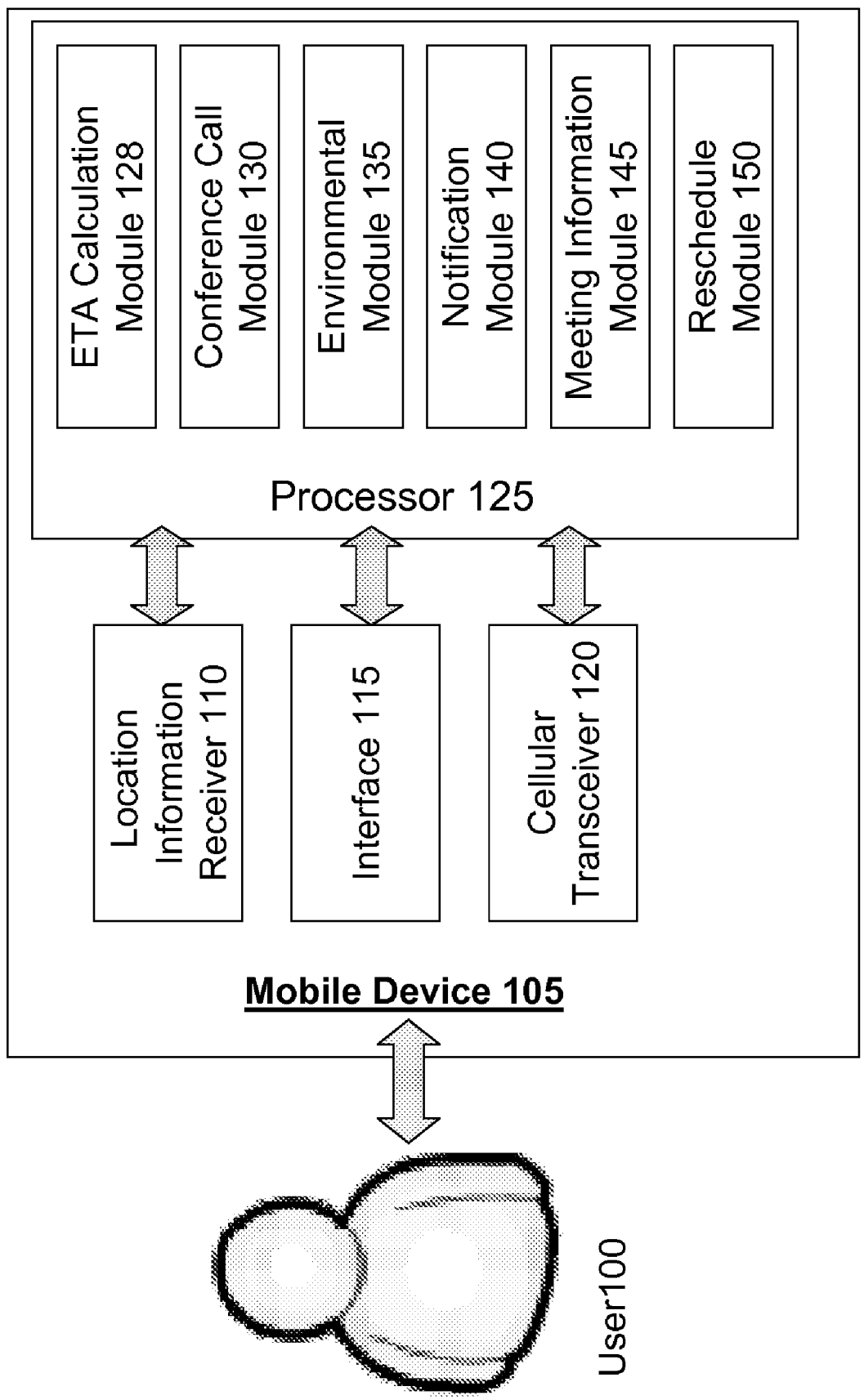
FIG. 1 depicts a block diagram of an example embodiment of a mobile device for providing and broadcasting an ETA.

FIG. 1 depicts an overall block diagram of an exemplary mobile device 105 to provide and broadcast an ETA. According to example embodiments, the mobile device 105 may be any appropriate mobile device, such as, for example, a portable device, a variety of computing devices including a portable media player, e.g., a portable music player, such as an MP3 player, a walkmans, etc., a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., or any other suitable portable electronic device. The mobile device 105 may include hardware components such as a location information receiver 110, a cellular transceiver 120, a processor 125, and an interface 115 such as a speaker, display, or the like. The mobile device 105 may also include software components such as an operating system that may control the hardware components.

According to one embodiment the location information receiver 110 may communicate with the processor 125 to provide the processor with location information. For example, the location information receiver 110 may enable the mobile device 105 to determine the current location of a user 100. To determine the current location, the location information receiver 110 may triangulate radiowaves, receive signals from a system of satellites (e.g. global positioning satellites (GPS)), receive signals from a system of computers, or the like.

The location information receiver 110 may also be used to determine the altitude, the direction in which the user 100 may be traveling, the remaining distance to the meeting location, and/or the speed at which the user 100 may be traveling.

In an example embodiment, the location information receiver 110 may calculate a location from the location information and provide the calculated location to the processor 125. In another example embodiment, the location information receiver 110 may receive the location information and provide the location information directly to the processor 125.

According to an example embodiment, the mobile device 105 may include the cellular transceiver 120. The cellular transceiver 120 may communicate with the processor 125 to provide information, such as received meeting information, to the processor. For example, the cellular transceiver 120 may be configured to enable the mobile device 105 to transmit and receive information over a network 155, described below in FIG. 2. The cellular transceiver 120 may include a transmitter and receiver housed either in a single unit, or in separate units. Additionally, the cellular transceiver 120 may include an antenna, a communication port, or a link that may be used to establish a communication session with the network 155.

In one embodiment, the mobile device may include the interface 115. The interface 115 may provide the mobile device 105 and the user 100 with a point of interaction and/or communication with the components of the mobile device 105. For example, the user 100 may use the interface 115 to provide and receive data from the processor 125. According to an example embodiment, the interface 115 may include software, hardware such as a speaker, a display, a light, or any other suitable component that may provide input to the mobile device 105 from the user 100 or output from the mobile device 105 to the user 100. For example, the interface 115 may include a display that may be may be used by the processor 125 to provide the user 100 with an ETA.

As shown in FIG. 1, the mobile device 105 may include the processor 125. The processor 125 may include any appropriate type of processor such as a single processor, multiple processors that may be distributed or centrally located, or the like. For example, the processor 125 may be a mobile communications device processor, a computer processor, a handheld processors, or the like. The processor 125 may also include any other suitable hardware such as cache, random access memory (RAM), read only memory (ROM), storage devices, or the like and/or software. According to one embodiment, the processor 125 may include, an ETA calculation module 128, a conference call module 130, an environmental module 135, a notification module 140, a meeting information module 145, and a reschedule module 150. The interface 115, the ETA calculation module 128, the conference call module 130, the environmental module 135, the notification module 140, the meeting information module 145, and the reschedule module 150 may be in operative communication with each other via, for example, a bus, or any other subsystem that may transfer information between components.

The meeting information module 145 may be configured to retrieve meeting information regarding the scheduled meeting. To retrieve the meeting information, the meeting information module 145 may interact with the cellular transceiver 120 to communicate with a scheduling database 175 via the network 155 (shown in FIG. 2). In communicating with the scheduling database 175, the meeting information module 145 may examine information within the scheduling database 175 for a scheduled meeting that may include the user 100 as a meeting participant. When a scheduled meeting may be identified, the meeting information module 145 may then retrieve information regarding that meeting. The retrieved information may include a location of the meeting, a time of the meeting, and meeting participants.

Figure 2:
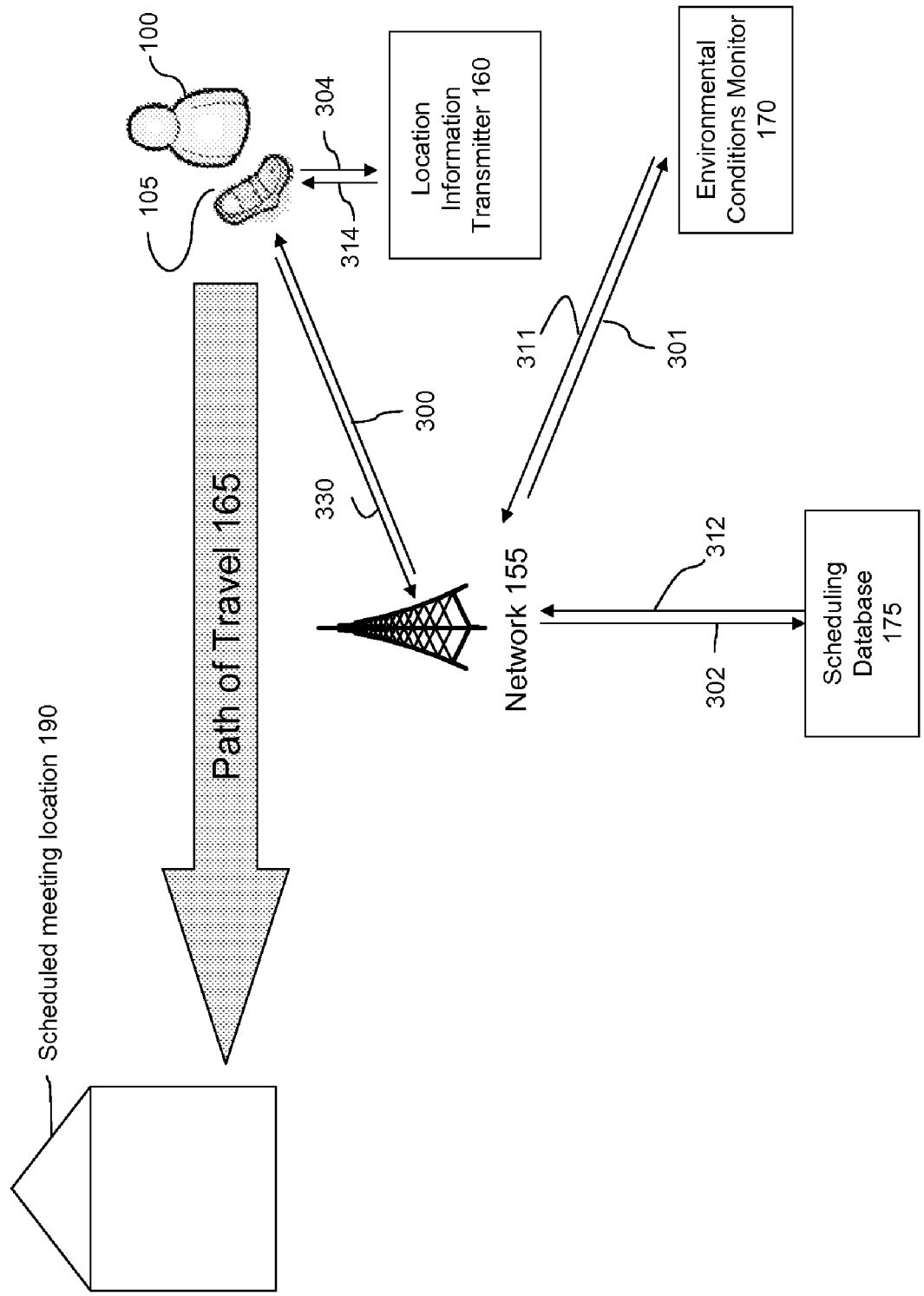
FIG. 2 depicts an example embodiment of a system and process for calculating an ETA to a scheduled meeting location.

The ETA calculation module 128 may provide the mobile device 105 with an ETA to a scheduled meeting location 190 (shown in FIG. 2). To calculate an ETA, the ETA calculation module 128 may request meeting information from the meeting information module 145, location information from the location information receiver 110, and environmental conditions from the environmental module 135. After receiving the requested information, the ETA calculation module 128 may determine a current location of the user 100 in relation to the meeting location. Additionally, the ETA calculation module 128 may calculate the ETA in accordance with the retrieved information that may include meeting information, location information, and environmental conditions.

In an example embodiment, the environmental module 135 may be configured to retrieve environmental conditions regarding the intended path the user 100 may travel to the scheduled meeting location 190. In retrieving the environmental conditions, the environmental module 135 may interact with the cellular transceiver 120 to communicate with an environmental conditions monitor 170 via the network 155 (shown in FIG. 2). The environmental conditions that may be retrieved may include, but are not limited to, current time, traffic conditions, weather conditions, legal speed limits along the path the user may travel, road conditions, a notice of traffic accidents, road construction, and road blockages. Moreover, the environmental module 135 may provide the environmental conditions to the mobile device 105.

As shown in FIG. 1, the processor 125 may include the notification module 140. The notification module 140 may be configured to transmit the ETA to scheduled meeting participants 183, as described below in FIG. 3A. To transmit the ETA to the scheduled meeting participants 183, such as the scheduled meeting participants 183 described with respect to FIG. 3A, the notification module 140 may request the ETA from the ETA calculation module 128 and the scheduled meeting participants 183 from the meeting information module 145. The notification module 140 may then interact with the cellular transceiver 120 to transmit the ETA to the scheduled meeting participants 183. In another example embodiment, the notification module 140 may transmit the ETA to the scheduling database 175.

In an example embodiment, the processor may further include the reschedule module 150. The reschedule module 150 may be configured to provide the scheduled meeting participants 183, described below with respect to FIG. 3A, with the ability to reschedule the meeting, continue the meeting, or initiate a conference call. Additionally, the reschedule meeting module 150 may determine when the user 100 may arrive late to the scheduled meeting location. To determine whether the user 100 may arrive late, the reschedule module 150 may interact with the meeting information module 145 to compare the ETA to the scheduled meeting time. Based on a determination that the user 100 may arrive late, the reschedule module 150 may request the scheduled meeting participants 183 from the meeting information module 145. The reschedule module 150 may then interact with the cellular transceiver 120 to transmit a notification to the scheduled meeting participants 183 that the user 100 may arrive late to the scheduled meeting. Such a notification may include an option that a scheduled meeting participant may select including to reschedule the meeting for a later time, to continue the meeting without the user 100, or to initiate a conference call with user 100. When the scheduled meeting participants 183 elect to reschedule the meeting, the reschedule module 150 may interact with the cellular transceiver 120 to communicate with the scheduling database 175 via the network 155. In communicating with the scheduling database 175, the reschedule module 150 may reschedule the meeting information to reflect the request of the scheduled meeting participants 183. When the scheduled meeting participants 183 elect to continue the meeting, the reschedule module 150 may take no action. When the scheduled meeting participants 183 elect to initiate a conference call with the user 100, the reschedule meeting module 150 may interact with the conference call module 130.

According to one embodiment, the processor 125 may also include the conference call module 130. The conference call module 130 may be configured to initiate a conference call. In initiating a conference call, the conference call module 130 may interact with the cellular transceiver 120 to communicate with a conference calling system 220, as described below in FIG. 4.

In an example embodiment, the conference call module 130 may be used to transfer the conference call to a landline when the location information indicates that the user 100 may be within a predetermined area. For example, one such predetermined location may be the office that belongs to user 100. The conference call module 130 may continually monitor the location information provided by the location information receiver 110 to determine the current location of the user 100. When the conference call module 130 determines that the current location of the user 100 corresponds to one of the predetermined areas, the conference call module 130 may interact with the conference calling system 220 to transfer the conference call to a landline associated with the predetermined area. Once the conference call has been transferred to the landline, the conference call module 130 may continue to monitor the current location of the user 100. Should the current location of the user 100 no longer correspond to one of the predetermined areas, the conference call module 130 may interface with the conference calling system 220 to transfer the conference call back to the mobile device.

Figure 6:
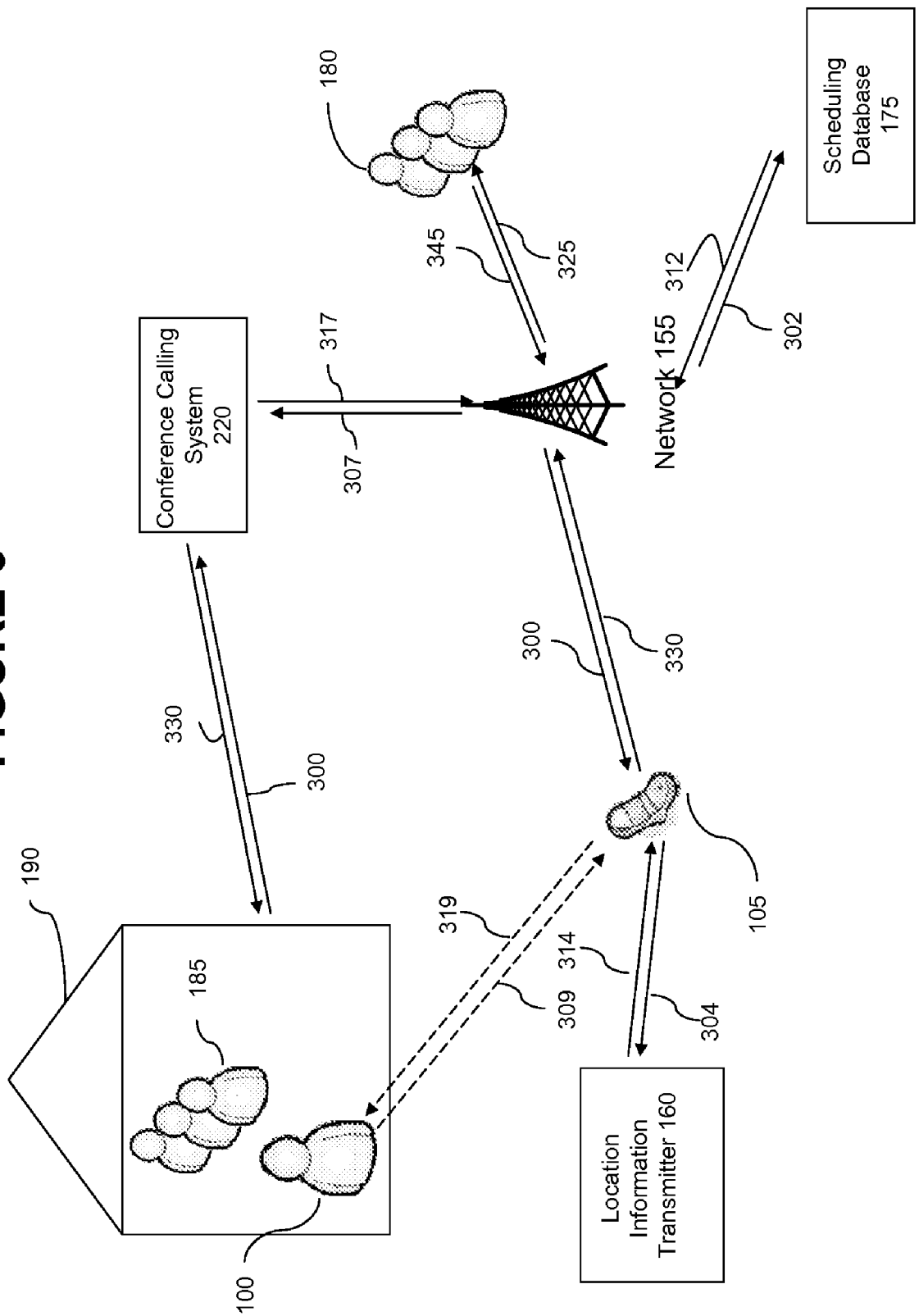
FIG. 6 depicts an example embodiment of a system and process for terminating the conference call when the location information indicates that the user has arrived at a scheduled meeting location.

The conference call module 130 mobile may also be used for terminating the conference call when the location information indicates that the user 100 has arrived at the scheduled meeting location 190, as described in FIG. 6. The conference call module 130 may continually monitor the location information received from the location information receiver 110 to determine the current location of the user. When the conference call module 130 determines that the current location of the user corresponds to the scheduled meeting location 190, the conference call module 130 may interact with the conference calling system 220 to terminate the conference call. When there are other scheduled meeting participants on the conference call who are not at the scheduled meeting location, the conference call module 130 may allow the other schedule meeting participants to continue the conference call. For example, the conference call module 130 may terminate a link to the user 100 but not a link to the other meeting participants. Once the conference call has terminated, the conference call monitor 130 may continue to monitor the current location of the user. Should the current location of the user no longer correspond to one of the predetermined areas, the mobile device may interface with the conference calling system 220, as described below in FIG. 5, to either initiate a new conference call, or to initiate a new link to a conference call already in progress.

FIG. 2 depicts an embodiment of a system and process for calculating an ETA to the scheduled meeting location. As shown in FIG. 2, the mobile device 105 may provide the user 100 with an ETA to a scheduled meeting location 190. To calculate the ETA, the mobile device 105 may retrieve meeting information form the scheduling database 175, environmental conditions from the environmental conditions monitor 170, and location information from the location information transmitter 160. After retrieving the meeting information, the environmental conditions, and the location information, the mobile device 105 may determine the current location of the user 100 in relation to the meeting location 190 and determine a path of travel 165 that the user 100 may follow. According to an example embodiment, the mobile device 105 may calculate the ETA based on the retrieved information that may include meeting information, location information, and environmental conditions. For example, the ETA may indicate that travel time is longer than normal due to snow and traffic.

At 302, the scheduling database may receive a request for meeting information via the network 155 from the mobile device that may be transmitting to the network 155 at 330. To provide the meeting information from the scheduling database 175, a search is performed within the scheduling database 175 for a scheduled meeting that may include the user 100 as a meeting participant. When a scheduled meeting may be identified, at 312, the scheduling database transmits information associated with the meeting via the network 155 to the mobile device 105 at 300. The meeting information may include a location of the meeting, a time of the meeting, and meeting participants. According to an example embodiment, the mobile device 105 may use the meeting information to determine a scheduled meeting location 190.

At 304, the location information transmitter 160 may receive a request for location information from the mobile device 105. To provide location information, the location information transmitter 160 may transmit the location information to the mobile device 105 at 314. The location information transmitter 160 may be a radio tower that emits radio waves, a system of a system of satellites (e.g. global positioning satellites (GPS)), a system of computers, or the like. Signals transmitted by the location information transmitter 160 may be received by the mobile device 105 and converted into location information that may be used to determine the current location of the user 100. Additionally, the location information may be used to determine the altitude, the direction in which the user 100 may be traveling, the remaining distance to the scheduled meeting location 190, and/or the speed at which the user 100 may be traveling.

At 301, an environmental conditions monitor 170 may receive a request for environmental conditions via the network 155 from the mobile device that may be transmitting to the network 155 at 330. In responding to the request, the environmental conditions monitor 170 may retrieve environmental conditions regarding a path of travel 165 that may lead the user 100 to the scheduled meeting location 190. The environmental conditions that are retrieved may include, but at not limited to, current time, traffic conditions, weather conditions, legal speed limits along the path the user may travel, road conditions, a notice of traffic accidents, road construction, and a road blockages. At 311, the environmental conditions monitor 170 may then transmit environmental conditions via network 155 to the mobile device 105 that receives the environmental conditions at 300.

Figure 3A:
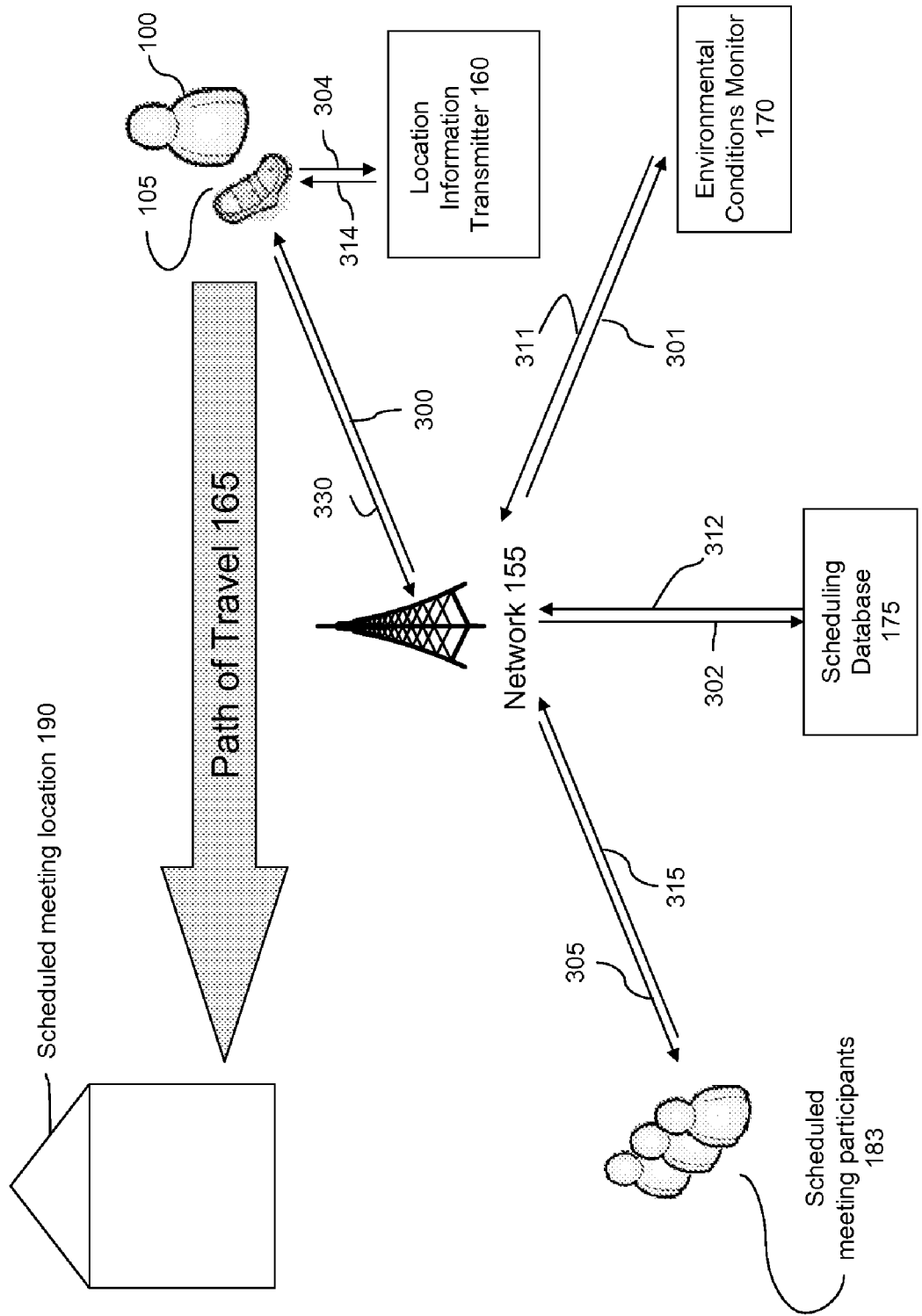
FIGS. 3A and 3B depict an example embodiment of a system and process for transmitting an ETA to scheduled meeting participants.

FIG. 3A depicts an example embodiment of a system for transmitting an ETA to scheduled meeting participants. The mobile device 105 may provide the scheduled meeting participants 183 with an ETA regarding then arrival of the user 100 at a scheduled meeting location 190. To provide the ETA to the scheduled meeting participants 183, the mobile device may calculate the ETA and transmit the ETA to the meeting participants. To calculate the ETA, mobile device 105 may retrieve meeting information form the scheduling database 175, environmental conditions from the environmental conditions monitor 170, and location information from the location information transmitter 160. When mobile device 105 retrieves the meeting information, the mobile device 105 may determine a current location of the user 100 in relation to the scheduled meeting location 190 and path of travel 165 that the user 100 may follow, as described above. Additionally, the mobile device 105 may calculate the ETA in accordance with the retrieved meeting information. The meeting information may include meeting information, location information, and environmental conditions. At 330, the mobile device 105 may transmit the ETA via the Network 155 to the scheduled meeting participants 183 that receive the ETA at 305.

At 305, the scheduled meeting participants 183 may receive the ETA that is transmitted by the mobile device 105 via the network 155 at 330. To transmit the ETA to the scheduled meeting participants 183, the mobile device 105 may identify the scheduled meeting participants 183 from the meeting information received from the scheduling database 175. When scheduled meeting participants 183 are identified, the mobile device 105 may notify each scheduled meeting participant of the ETA. In an example embodiment, the scheduled meeting participants 183 may confirm the receipt of the ETA by transmitting an acceptance response to the network 155, at 315, that is received by the mobile device 105 at 300. In another embodiment, at the mobile device 105 may transmit the ETA to the scheduling database 175.

Figure 3B:
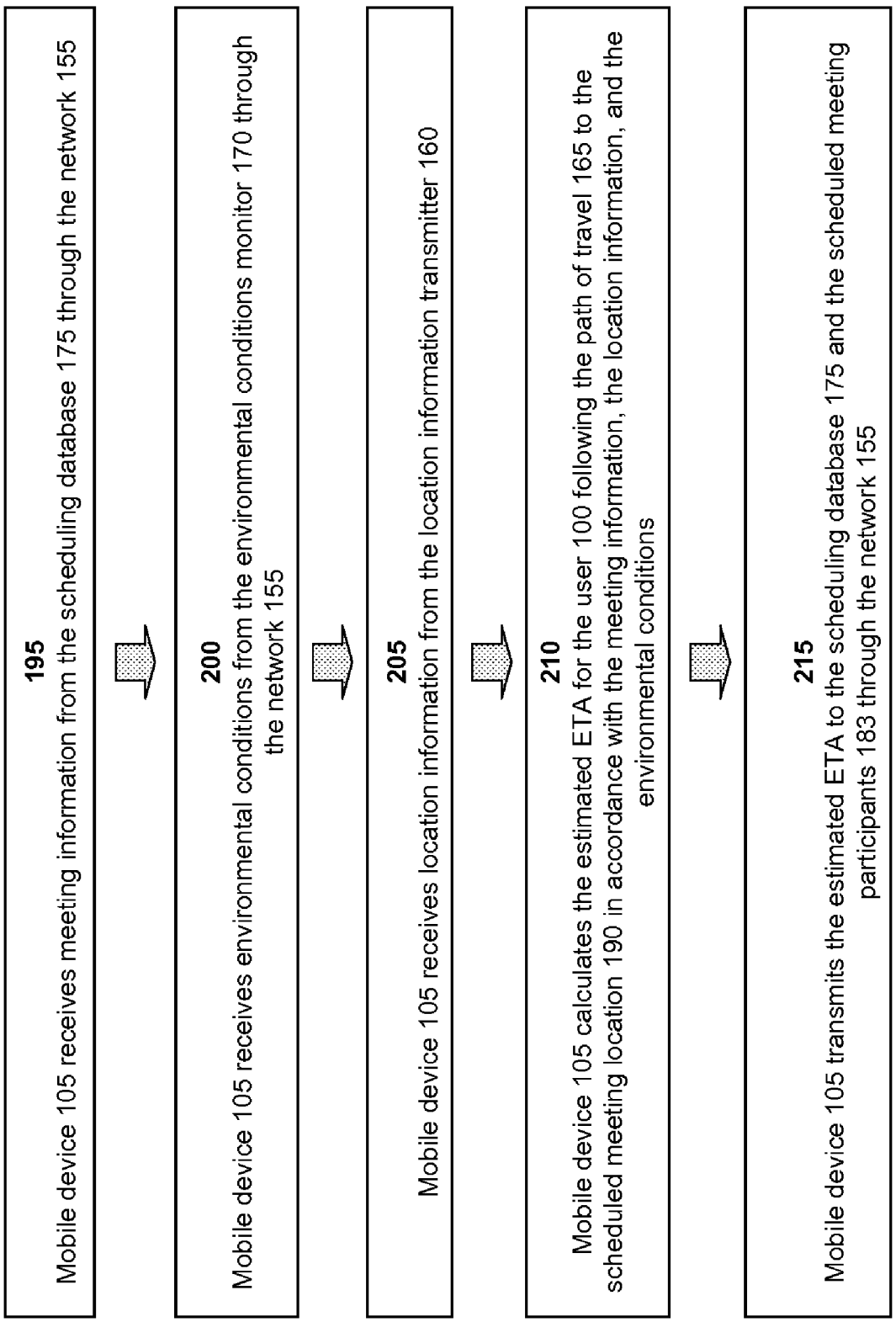

FIG. 3B depicts an example embodiment of a process for transmitting an ETA to scheduled meeting participants. The mobile device 105 may provide the scheduled meeting participants 183 with an ETA regarding a user 100 arrival at a scheduled meeting location 190. To provide the ETA to the scheduled meeting participants 183, the mobile device may calculate and transmit the ETA to the meeting participants. At 195, the mobile device 105 may receive meeting information form the scheduling database 175 via the network 155. The mobile device 105 may receive the environmental conditions, at 200, from the environmental conditions monitor 170 via the network 155. At 205, the mobile device 105 may receive location information from the location information transmitter 160. At 210, the mobile device 105 may calculate the ETA for the user 100 following the path of travel 165 to the scheduled meeting location 190 in accordance with the meeting information, the location information, and the environmental conditions. At 215, the mobile device 105 may transmit the ETA to the scheduling database 175 and the scheduled meeting participants 183 via the network 155.

FIG. 4 depicts an example embodiment of a system and process for initiating a conference call at the time of the scheduled meeting. The mobile device 105 may provide the scheduled meeting participants 183 with the ability to reschedule the meeting, continue the meeting, or initiate a conference call. To provide the scheduled meeting participants 183 with the ability to reschedule the meeting, continue the meeting, or to initiate a conference call, the mobile device 105 may determine, from the ETA, whether the user 100 may arrive late to the scheduled meeting location 190. To determine whether the user 100 may arrive late, the mobile device 105 may interact with the scheduling database 175 to compare the ETA to the scheduled meeting time. When user 100 may arrive late, the mobile device 105 may obtain the scheduled meeting participants from scheduling database 175. The mobile device may then transmit a notification to the scheduled meeting participants 183 that the user 100 may arrive late to the scheduled meeting. Such a notification may include an option that a scheduled meeting participant may select including to reschedule the meeting for a later time, to continue the meeting without the user 100, or to initiate a conference call with user 100. When the scheduled meeting participants 183 elect to reschedule the meeting, the mobile device 105 may interact with the scheduling database 175 via the network 155. In interacting with the scheduling database 175, the mobile device 105 may reschedule the meeting information to reflect the scheduled meeting participants' 183 request. When the scheduled meeting participants 183 elect to continue the meeting, the mobile device 105 may take no action. When the scheduled meeting participants 183 elect to initiate a conference call with the user 100, the mobile device 105 may interact with the conference calling system 220.

At 302, the scheduling database may receive a request for meeting information via the network 155 from the mobile device that may be transmitting to the network 155 at 330. To provide the meeting information from the scheduling database 175, a search is performed within the scheduling database 175 for a scheduled meeting that may include the user 100 as a meeting participant. When a scheduled meeting may be identified, at 312, the scheduling database transmits information associated with the meeting via the network 155 to the mobile device 105 that receives the information at 300. The meeting information may include a location of the meeting, a time of the meeting, and meeting participants. According to an example embodiment, the mobile device 105 may use the meeting information to determine a scheduled meeting location 190 and the scheduled meeting participants 183. The scheduled meeting participants 183 may include the user 100, the offsite scheduled meeting participants 180 and the onsite scheduled meeting participants 185.

At 304, the location information transmitter 160 may receive a request for location information from the mobile device 105. To provide location information, the location information transmitter 160 may transmit the location information to the mobile device 105 at 314. The location information transmitter 160 may be a radio tower that emits radio waves, a system of a system of satellites (e.g. global positioning satellites (GPS)), a system of computers, or the like. Signals transmitted by the location information transmitter 160 may be received by the mobile device 105 and converted into location information that may be used to determine the current location of the user 100. Additionally, the location information may be used to determine the altitude, the direction in which the user 100 may be traveling, the remaining distance to the scheduled meeting location 190, and/or the speed at which the user 100 may be traveling.

At 308, the onsite scheduled meeting participants 185 may receive the ETA that is transmitted by the mobile device 105 via the network 155 at 330. The onsite scheduled meeting participants 185 are scheduled meeting participants 183 that are not at the scheduled meeting location 190. To transmit the ETA to the meeting participants, the mobile device 105 may identify the onsite scheduled meeting participants 185 from the meeting information received from the scheduling database 175. The mobile device 105 may then determine from the ETA that the user 100 may arrive late to the scheduled meeting location. When the mobile device determines that the user 100 may arrive late, the mobile device 105 may notify the onsite scheduled meeting participants 185. Such a notification may be at least one of three options that the onsite meeting participants may elect: to reschedule the meeting for a later time, to continue the meeting without the user 100, or to initiate a conference call with the user 100. In an example embodiment, the onsite scheduled meeting participants 185 may confirm the receipt of the ETA by transmitting an acceptance response to the network 155, at 318, that is received by the mobile device 105 at 300.

At 325, the offsite scheduled meeting participants 180 may receive the ETA that is transmitted by the mobile device 105 via the network 155 at 330. The offsite scheduled meeting participants 180 are scheduled meeting participants 183 that are not at the scheduled meeting location 190. To transmit the ETA to the meeting participants, the mobile device 105 may identify the offsite scheduled meeting participants 180 from the meeting information received from the scheduling database 175. The mobile device 105 may then determine from the ETA that the user 100 may arrive late to the scheduled meeting location. When the mobile device determines that the user 100 may arrive late, the mobile device 105 may notify the offsite scheduled meeting participants 180. Such a notification may be at least one of three options that the onsite meeting participants may elect: to reschedule the meeting for a later time, to continue the meeting without the user 100, or to initiate a conference call with user 100. In an example embodiment, the offsite scheduled meeting participants 180 may confirm the receipt of the ETA by transmitting an acceptance response to the network 155, at 345, that is received by the mobile device 105 at 300.

At 307, the conference calling system 220 may receive a request to initiate a conference call that may have been transmitted by the mobile device 105 via the network 155 at 330. The mobile device may make such requests on behalf of the onsite scheduled meeting participants 185 and the offsite scheduled meeting participants 180. To initiate a conference call, the conference calling system 220 may bring the onsite scheduled meeting participants 185 into the conference call at 316 via landline by transmitting information regarding the conference call to the onsite scheduled meeting participants 185 at 306. The conference calling system may also bring the offsite scheduled meeting participants 183 into the conference call at 345 via network 155 by transmitting information regarding the conference call to the network 155 at 317 where it can the be received by the offsite scheduled meeting participants 180 at 325. In another embodiment, the conference calling system may also bring the onsite scheduled meeting participants 185 into the conference call at 318 via network 155 by transmitting information regarding the conference call to the network 155 at 317 where it can the be received by the onsite scheduled meeting participants 180 at 308. In another embodiment, the conference calling system may also bring the user 100 into the conference call at 300 via network 155 by transmitting information regarding the conference call to the network 155 at 317 where it can the be received by the user 100 at 300.

FIG. 5 depicts an example embodiment of a system and process for transferring the conference call to a landline when the location information indicates that the user may be within a predetermined area. The mobile device 105 may transfer the conference call to a landline when the location information indicates that the user 100 may be within a predetermined area 225. For example, one such predetermined location may be the user's office The mobile device 105 may continually monitor the location information provided by the location information transmitter 160 at 314 to determine the current location of the user 100. When the mobile device 105 determines that the current location of the user 100 corresponds to the predetermined area 225, the mobile device may interact with the conference calling system 220 to transfer the conference call from mobile device 105 (shown at 319) to a landline 310. Once the conference call has been transferred to the landline 310, the mobile device 105 may continue to monitor the current location of the user 100. Should the user's current location no longer correspond to the predetermined area 225, the mobile device 105 may interface with the conference calling system 220 to transfer the conference call back to the mobile device 105.

At 307, the conference calling system 220 may receive a request to initiate a conference call that may have been transmitted by the mobile device 105 via the network 155 at 330.

At 309, the user 100 may response to the conference call that may be provided by the mobile device 105 at 319. To provide the conference call to the user 100, the mobile device 105 may interface with the conference calling system 220 by transmitting information to the network 155 at 330 to be received by the conference calling system 220 at 307. The conference calling system 220 may also provide the conference call to the mobile device 105 by transmitting the conference call to the network 155 at 317 to be received by the mobile device 105 at 300.

At 310, the conference calling system 220 may be able to directly provide the conference call to user 100 that may be located at the predetermined location. Additionally, the conference calling system may be able to receive information directly from the user 100 at 320. When the mobile device 105 determines that the current location of the user 100 corresponds to the predetermined area 225, the mobile device may interact with the conference calling system 220 to transfer the conference call from mobile device 105 (shown at 319) to a landline 310. In transferring the conference call, the conference calling system 220 may directly interact with the user 100 at 310. Once the conference calling system connects with the user, the conference calling system 220 may notify the mobile device 105, via the network 155 at 317, and the mobile device may terminate the conference call occurring at 319.

FIG. 6 depicts an example embodiment of a system and process for terminating the conference call when the location information indicates that the user has arrived at the location of the scheduled meeting. In one embodiment, the mobile device 105 may terminate a conference call when location information received from, for example, the location information transmitter 160 indicates that the user 100 has arrived at the scheduled meeting location 190. For example, the mobile device 105 may continually monitor the information location information received from the location information transmitter 160 to determine the current location of the user 100. When the mobile device 105 determines that the current location of the user 100 corresponds to the scheduled meeting location 190, mobile device 105 may interact with the conference calling system 220 to terminate the conference call on the mobile device 105 at 319. When there are offsite scheduled meeting participants 180 on the conference call, then the mobile device 105 may terminate only the mobile device's 105 link at 319 to that conference call. Once the conference call has terminated, the mobile device 105 may continue to monitor the current location of the user 100. Should a current location of the user 100 no longer correspond to the scheduled meeting location 190, the mobile device 105 may interface with the conference calling system 220 via the network 115 to either initiate a new conference call, or to initiate a new link to a conference call already in progress.

The following description sets forth some exemplary telephony radio networks and non-limiting operating environments for broadcasting an ETA. The below-described operating environments should be considered non-exhaustive, however, and thus the below-described network architectures merely shows how broadcasting an ETA may be incorporated into existing network structures and architectures. It may be appreciated, however, that broadcasting an ETA may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1× Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques described herein may be applied independently of the method for data transport, and do not depend on any particular network architecture, or underlying protocols.

Figure 7:
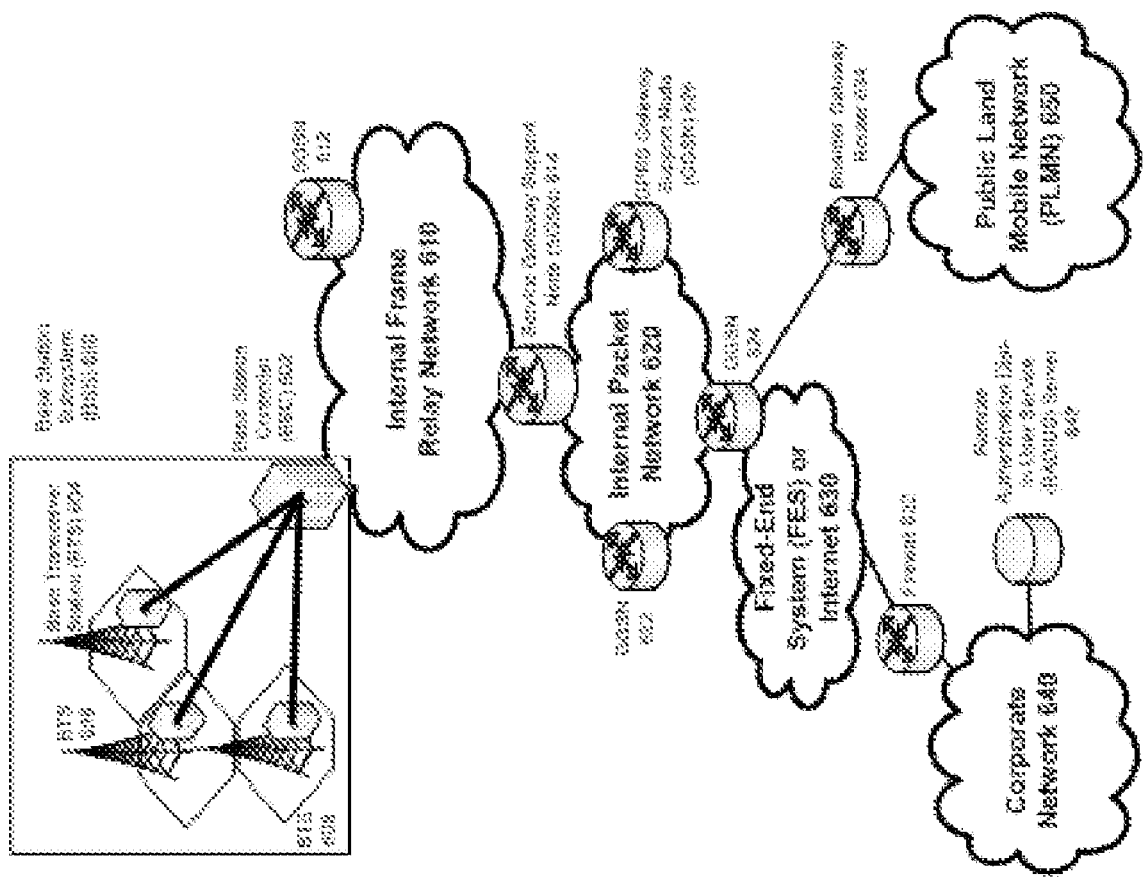
FIG. 7 depicts an example embodiment of an overall block diagram of an exemplary packet-based mobile cellular network environment, such as a GPRS network, that may be used to provided and broadcast the ETA of a user.

FIG. 7 depicts an overall block diagram of an exemplary packet-based mobile cellular network environment, such as a GPRS network, that may be used to broadcast ETA. In an example configuration, the network 155 may be encompassed by the network environment depicted in FIG. 7. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from mobile devices (e.g., mobile device 105) is transported via an over-the-air interface to a BTSS 608, and from the BTSS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 8:
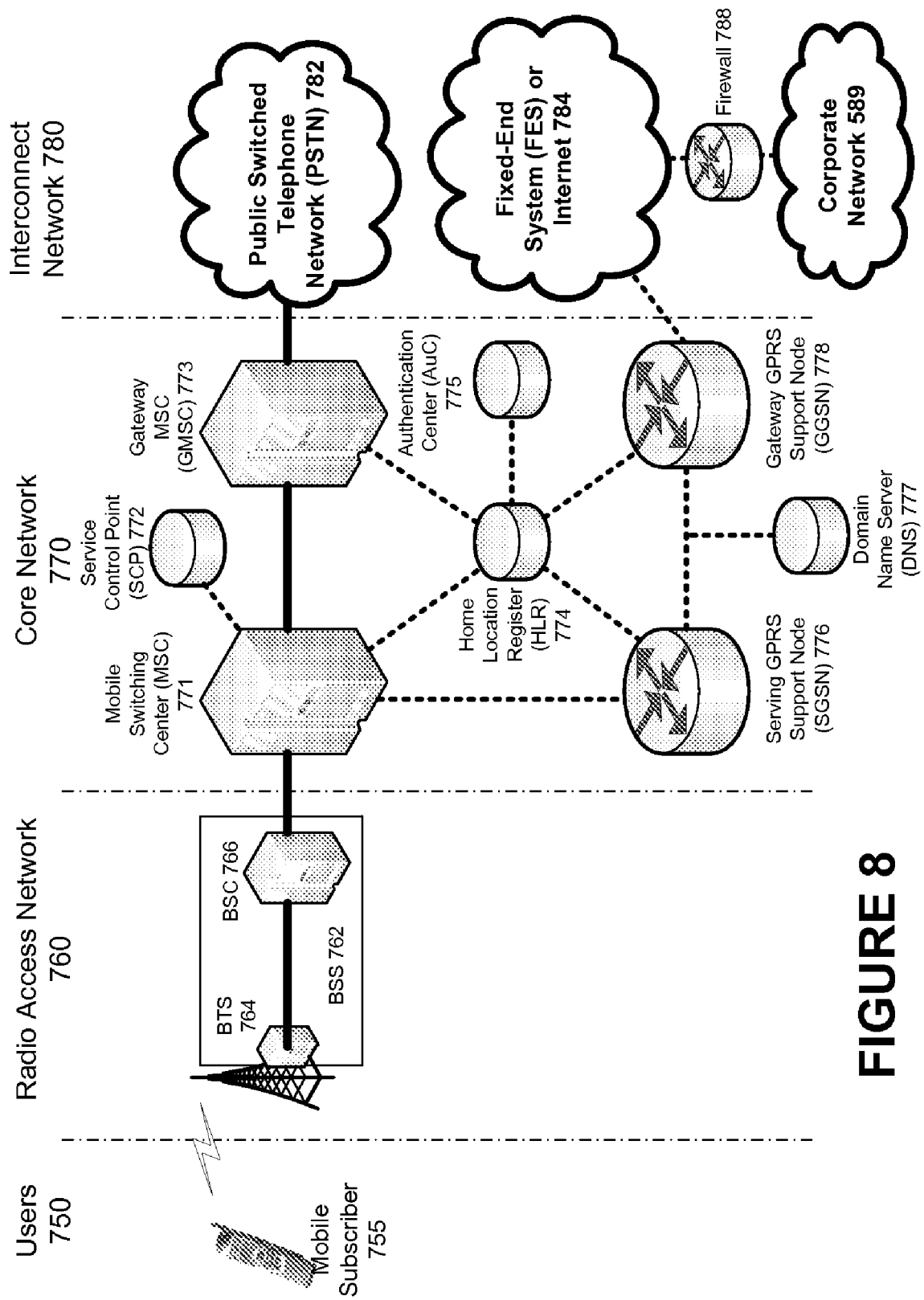
FIG. 8 illustrates an architecture of a typical GPRS network as segmented into four groups.

FIG. 8 illustrates an architecture of a typical GPRS network as segmented into four groups: users 750, radio access network 760, core network 770, and interconnect network 780. In an example configuration the network 155 may be encompassed by the radio access network 760, core network 770, and interconnect network 780. Users 750 comprise a plurality of end users (though only mobile subscriber 755 is shown in FIG. 8). In an example embodiment, the device depicted as mobile subscriber 755 comprises mobile device 105. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then transmits the data traffic to GGSN 778 for further forwarding.

When MSC 771 receives call traffic, for example, from BSCS 766, it transmits a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 105, used by an end user of the mobile cellular service. When a mobile subscriber turns on his or her mobile device, the mobile device goes through an attach process by which the mobile device attaches to an SGSN of the GPRS network. In FIG. 8, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 transmits a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 transmits an Attach Accept message to mobile subscriber 755, which in turn transmits an Attach Complete message to SGSN 776.

After attaching itself with the network, mobile subscriber 755 then goes through the authentication process. In the authentication process, SGSN 776 transmits the authentication information to HLR 774, which transmits information back to SGSN 776 based on the user profile that was part of the user's initial setup. The SGSN 776 then transmits a request for authentication and ciphering to mobile subscriber 755. The mobile subscriber 755 uses an algorithm to transmit the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 8) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then transmits to GGSN 778 a Create Packet Data Protocol ("PDP") Context Request message that contains necessary information. The GGSN 778 transmits a Create PDP Context Response message to SGSN 776, which then transmits an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of broadcasting an ETA include but are not limited to Gateway GPRS Support Node tables, Fixed End System router tables, firewall systems, VPN tunnels, and any number of other network elements as required by the particular digital network.

Figure 9:
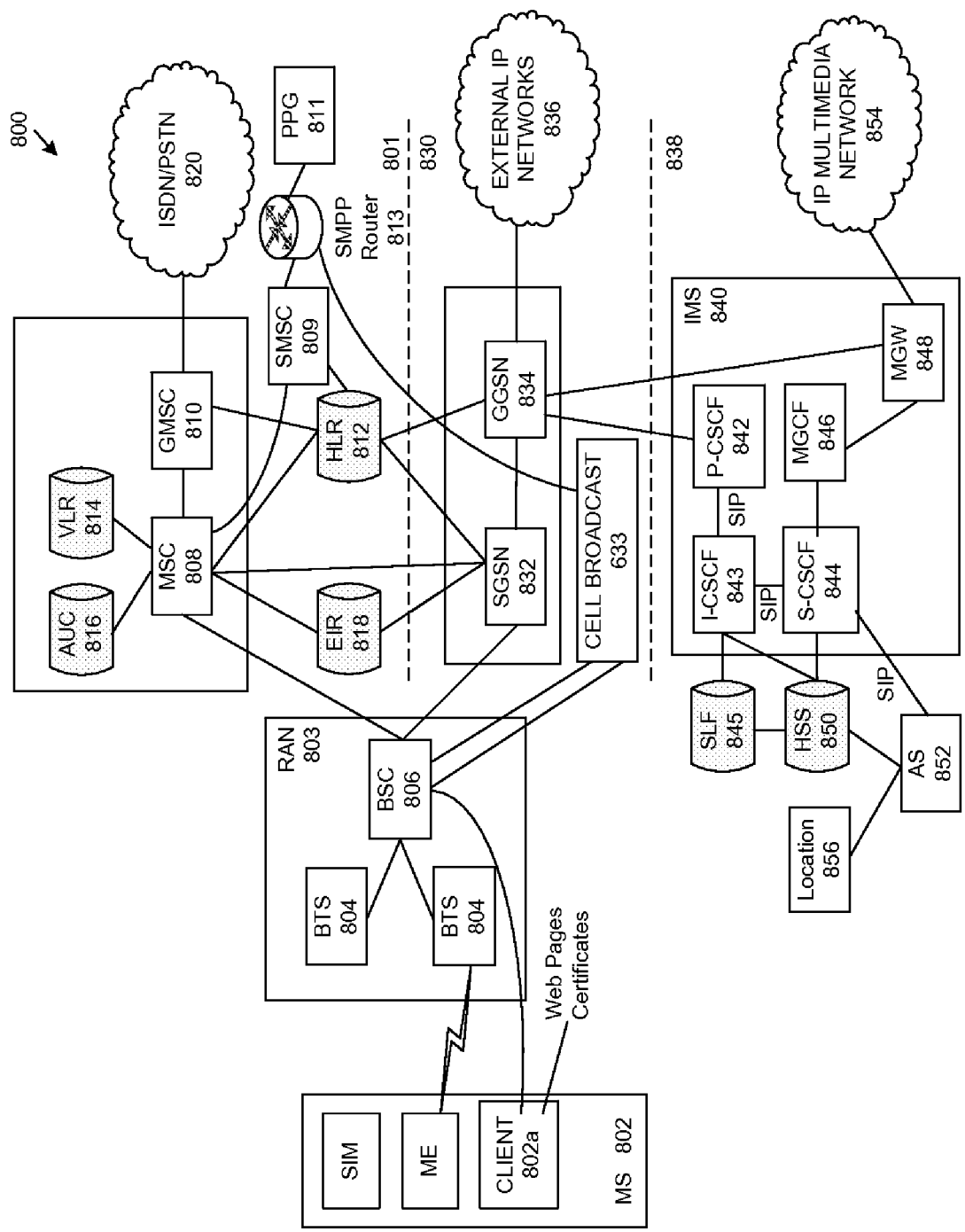
FIG. 9 illustrates an example alternate block diagram of an example embodiment of a GSM/GPRS/IP multimedia network architecture that may be used to provide and broadcast an ETA.

FIG. 9 illustrates another exemplary block diagram view of a GSM/GPRS/IP multimedia network architecture 800 that may be used to broadcast an ETA. As illustrated, architecture 800 of FIG. 9 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 105) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., transmit without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 transmits a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of device user MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of broadcasting an ETA may be described in connection with various computing devices, the underlying concepts may be applied to any computing device or system capable of broadcasting an ETA. The various techniques described herein may be implemented in connection with hardware or software or, where appropriate, with a combination of both. Thus, the methods and apparatus of broadcasting an ETA, or certain aspects or portions thereof, may take the form of program code (i.e., instructions) embodied in tangible media, such as floppy diskettes, CD-ROMs, hard drives, or any other machine-readable storage medium, wherein, when the program code may be loaded into and executed by a machine, such as a computer, the machine may become an apparatus for broadcasting an ETA. In the case of program code execution on programmable computers, the computing device may generally include a processor, a storage medium readable by the processor (including volatile and non-volatile memory and/or storage elements), at least one input device, and at least one output device. The program(s)

may be implemented in assembly or machine language, if desired. In any case, the language may be a compiled or interpreted language, and combined with hardware implementations.

The methods and apparatus of broadcasting an ETA also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine may become an apparatus for broadcasting an ETA. When implemented on a general-purpose processor, the program code may combine with the processor to provide a unique apparatus that operates to invoke the functionality of broadcasting an ETA. Additionally, any storage techniques used in connection with broadcasting an ETA may invariably be a combination of hardware and software.

While broadcasting an ETA may have been described in connection with the various embodiments of the various figures, it is to be understood that other similar embodiments may be used or modifications and additions may be made to the described embodiment for performing the same functions described herein. For example, one skilled in the art will recognize that a system for broadcasting an ETA may apply to any environment, whether wired or wireless, and may be applied to any number of devices connected via a communications network and interacting across the network.

What is claimed:

1. A method comprising:
    retrieving meeting information associated with a scheduled meeting, the meeting information comprising at least one of a location of the scheduled meeting, a time of the scheduled meeting and an indication of meeting participants;
    calculating, by a processor, an estimated time of arrival (ETA) to the scheduled meeting in accordance with the scheduled meeting information;
    transmitting the ETA to the scheduled meeting participants;
    determining, based upon the ETA, whether a user will arrive late to the scheduled meeting;
    when it is determined that the user will arrive late, initiating, by the processor, a conference call; and
    terminating, by the processor, the conference call when the location information indicates that the user has arrived at the location of the scheduled meeting.

2. The method of claim 1, further comprising:
    retrieving location information, the location information comprising at least a current location of the user.

3. The method of claim 2, wherein calculating the ETA to the scheduled meeting is in accordance with the scheduled meeting information and the location information.

4. The method of claim 3, further comprising:
    retrieving environmental conditions associated with an intended path of the user to the scheduled meeting, the environmental conditions comprising at least a current time.

5. The method of claim 4, where in calculating the ETA to the scheduled meeting occurs in accordance with the scheduled meeting information, the location information, and the environmental conditions.

6. The method of claim 5, wherein the location information further comprises a remaining distance to the scheduled meeting location, and a speed at which the user will be traveling.

7. The method of claim 5, wherein the environmental conditions further comprise at least one of: traffic conditions, weather conditions, legal speed limits along a path the user will travel, road conditions, a notice of traffic accidents, road construction, or a road blockage.

8. The method of claim 5 further comprising:
    when it is determined that the user will arrive late, providing the scheduled meeting participants an ability to perform at least one of the following: reschedule the scheduled meeting or continue the scheduled meeting.

9. The method of claim 1 further comprising:
    transferring the conference call to a landline when the location information indicates that the user will be within a predetermined area.

10. The method of claim 5 further comprising:
    monitoring changes that occur to at least one of the scheduled meeting, the location information, or the environmental conditions;
    calculating an updated ETA for the user when changes to the scheduled meeting information, the location information, or the environmental conditions warrant doing so; and
    transmitting the updated ETA to the scheduled meeting participants.

11. A mobile device comprising:
    a cellular transceiver for receiving and transmitting cellular communication signals;
    a location information receiver for receiving location information, the location information containing at least a current location of a user; and
    a processor configured to execute processor-executable instructions to:
        retrieve scheduled meeting information regarding a scheduled meeting, the scheduled meeting information containing at least one of a location of the meeting, a time of the meeting and meeting participants;
        retrieve environmental conditions regarding an intended path the user will travel to the scheduled meeting, the environmental conditions containing at least a current time; and
        calculate an estimated time of arrival (ETA) to the scheduled meeting in accordance with the scheduled meeting information, the location information, and the environmental conditions; and
        transmit the ETA to meeting participants;
        determine, based upon the ETA, whether the user will arrive late to the scheduled meeting;
        when it is determined that the user will arrive late, initiate a conference call; and
        terminate the conference call when the location information indicates that the user has arrived at the location of the scheduled meeting.

12. The device of claim 11, wherein the location information further comprises at least one of a remaining distance to the meeting location, or a speed at which the user will be traveling.

13. The device of claim 11, wherein the environmental conditions further comprises at least one of traffic conditions, weather conditions, legal speed limits along the intended path the user will travel, road conditions, a notice of traffic accidents, road construction, or a road blockage.

14. The device of claim 11, the processor further configured to: when it is determined that the user will arrive late, provide the meeting participants an ability to at least one of reschedule the meeting or continue the meeting.

15. The device of claim 11, the processor further configured to transfer the conference call to a landline when the location information indicates that the user will be within a predetermined area.

16. The device of claim 11, the processor further configured to:
- calculate an updated ETA for the user when changes to the scheduled meeting information, the location information, or the environmental conditions warrant doing so;
- monitor changes that occur to at least one of the scheduled meeting information, the location information, and the environmental conditions; and
- transmit the updated ETA to the scheduled meeting participants.

17. A computer-readable storage medium, wherein the computer-readable storage medium is not a transient signal, the computer-readable storage medium comprising instruction, that when executed, cause a processor to:
- retrieve meeting information associated with a scheduled meeting, the meeting information comprising at least one of a location of the scheduled meeting, a time of the scheduled meeting and an indication of meeting participants;
- calculate an estimated time of arrival (ETA) to the scheduled meeting in accordance with the scheduled meeting information;
- transmit the ETA to the scheduled meeting participants;
- determine, based upon the ETA, whether a user will arrive late to the scheduled meeting;
- when it is determined that the user will arrive late, initiate a conference call; and
- terminate the conference call when the location information indicates that the user has arrived at the location of the scheduled meeting.

18. The computer-readable storage medium of claim 17, the instructions further for causing the processor to:
- retrieve location information, the location information comprising at least a current location of the user.

19. The computer-readable storage medium of claim 18, wherein calculating the ETA to the scheduled meeting is in accordance with the scheduled meeting information and the location information.

20. The computer-readable storage medium of claim 18, the instructions further for causing the processor to:
- retrieve environmental conditions associated with an intended path of the user to the scheduled meeting, the environmental conditions comprising at least a current time.

* * * * *